(12) United States Patent
Schneider et al.

(10) Patent No.: US 10,279,736 B2
(45) Date of Patent: May 7, 2019

(54) VEHICLE INTERIOR TRIM ASSEMBLY CONFIGURED TO FORM A LIGHT PATTERN HAVING AN EMBLEM SHAPE AT THE FRONT OF A TRIM PART SUCH AS AN AIR BAG COVER

(71) Applicant: JVIS-USA, LLC, Sterling Heights, MI (US)

(72) Inventors: Ingo E. Schneider, Washington, MI (US); Richard L. Arundale, Leonard, MI (US); Remon S. Jiddou, Sterling Heights, MI (US)

(73) Assignee: JVIS-USA, LLC, Sterling Heights, MI (US)

( * ) Notice: Subject to any disclaimer, the term of this patent is extended or adjusted under 35 U.S.C. 154(b) by 203 days.

(21) Appl. No.: 15/637,517

(22) Filed: Jun. 29, 2017

(65) Prior Publication Data

US 2019/0001878 A1    Jan. 3, 2019

(51) Int. Cl.
*B60Q 3/60* (2017.01)
*F21V 5/04* (2006.01)
(Continued)

(52) U.S. Cl.
CPC .............. *B60Q 3/60* (2017.02); *B29C 45/02* (2013.01); *B29C 45/16* (2013.01); *B29D 11/00317* (2013.01); *B29D 11/00605* (2013.01); *B60Q 3/54* (2017.02); *B60R 13/005* (2013.01); *B60R 13/02* (2013.01); *F21V 5/04* (2013.01); *F21V 7/0091* (2013.01); *F21V 19/003* (2013.01);
(Continued)

(58) Field of Classification Search
CPC ........ B60Q 3/60; B60Q 3/54; B60Q 2500/10; B29D 11/00605; B29C 45/16; B29C 45/02; B60R 13/005; F21V 19/003; F21V 7/0091; F21V 5/04; B29L 2011/0016; B29L 2031/3005; B29L 2031/3038; H05B 33/0845; F21Y 2115/10; B29K 2995/003
See application file for complete search history.

(56) References Cited

U.S. PATENT DOCUMENTS 5,005,108 A    4/1991  Pristash et al.
5,542,694 A    8/1996  Davis
(Continued)

FOREIGN PATENT DOCUMENTS

GB    2492100 A    12/2012

*Primary Examiner* — David V Bruce
(74) *Attorney, Agent, or Firm* — Brooks Kushman P.C.

(57) ABSTRACT

A vehicle interior trim assembly such as an air bag cover assembly having an illuminable emblem is provided. The assembly includes a vehicle interior trim part and an illumination module having a light source configured to generate visible light rays when energized. A lens includes at least one layer molded in a molding process from an optical-grade material. The lens has a pattern of light-extracting deformities to extract light rays from an interior of the lens at a set of surface-defining areas of the lens. The surface-defining areas are sized, shaped and arranged laterally relative to each other in an emblem pattern. A decorative emblem has reflective surfaces overlying and spaced away from the surface-defining areas by an air gap. The extracted light rays traveling across the gap are reflected by the reflective surfaces to generate light in the emblem pattern about peripheral surfaces of the decorative emblem.

26 Claims, 2 Drawing Sheets

(51) Int. Cl.

| | | |
|---|---|---|
| *F21V 7/00* | (2006.01) | |
| *F21V 19/00* | (2006.01) | |
| *B60Q 3/54* | (2017.01) | |
| *B60R 13/00* | (2006.01) | |
| *B29C 45/02* | (2006.01) | |
| *B29D 11/00* | (2006.01) | |
| *B29C 45/16* | (2006.01) | |
| *B60R 13/02* | (2006.01) | |
| *F21Y 115/10* | (2016.01) | |
| *H05B 33/08* | (2006.01) | |
| *B29L 11/00* | (2006.01) | |
| *B29L 31/30* | (2006.01) | |

(52) U.S. Cl.
CPC . *B29K 2995/003* (2013.01); *B29L 2011/0016* (2013.01); *B29L 2031/3005* (2013.01); *B29L 2031/3038* (2013.01); *B60Q 2500/10* (2013.01); *F21Y 2115/10* (2016.08); *H05B 33/0845* (2013.01)

(56) References Cited

U.S. PATENT DOCUMENTS

| | | |
|---|---|---|
| 5,549,323 A | 8/1996 | Davis |
| 5,558,364 A | 9/1996 | Davis |
| 5,895,115 A | 4/1999 | Parker et al. |
| 6,053,526 A | 4/2000 | Preisler et al. |
| 6,062,595 A | 5/2000 | Ha |
| 6,158,867 A | 12/2000 | Parker et al. |
| 6,193,399 B1 | 2/2001 | Hulse |
| 6,464,381 B2 | 10/2002 | Anderson, Jr. et al. |
| 6,594,417 B1 | 7/2003 | Hulse |
| 6,652,128 B2 | 11/2003 | Misaras |
| 6,676,472 B1 | 1/2004 | Trentelman |
| 6,974,238 B2 | 12/2005 | Sturt et al. |
| 7,150,550 B2 | 12/2006 | Bogdan et al. |
| 7,201,588 B2 | 4/2007 | Nishigaki et al. |
| 7,237,933 B2 | 7/2007 | Radu et al. |
| 7,299,892 B2 | 11/2007 | Radu et al. |
| 7,387,397 B2 | 6/2008 | Konet et al. |
| 7,441,801 B2 | 10/2008 | Nakamura et al. |
| 7,866,858 B2 | 1/2011 | Hirzmann |
| 7,987,030 B2 | 7/2011 | Flores et al. |
| 8,016,465 B2 | 9/2011 | Egerer et al. |
| 8,061,861 B2 | 11/2011 | Paxton et al. |
| 8,067,556 B2 | 11/2011 | Hogrefe et al. |
| 8,075,173 B2 | 12/2011 | Shallcross et al. |
| 8,162,519 B2 | 4/2012 | Salter et al. |
| 8,210,564 B2 | 6/2012 | McHugh et al. |
| 8,215,810 B2 | 7/2012 | Welch, Sr. et al. |
| 8,235,567 B2 | 8/2012 | Hipshier et al. |
| 8,256,945 B2 | 9/2012 | Choquet |
| 8,408,627 B2 | 4/2013 | Mann |
| 8,408,766 B2 | 4/2013 | Wilson et al. |
| 8,425,062 B2 | 4/2013 | Bowden et al. |
| 8,449,161 B2 | 5/2013 | Igoe et al. |
| 8,469,562 B2 | 6/2013 | Marzorati et al. |
| 8,596,803 B2 | 12/2013 | Schultz et al. |
| 8,627,586 B2 | 1/2014 | Bozio et al. |
| 8,816,586 B2 | 8/2014 | Marcove et al. |
| 8,925,959 B2 | 1/2015 | Bosch et al. |
| 9,376,055 B2 | 6/2016 | Sura et al. |
| 9,446,734 B2 | 9/2016 | Bosch et al. |
| 9,481,296 B2 | 11/2016 | Roberts et al. |
| 2003/0209889 A1 | 11/2003 | Erwin et al. |
| 2004/0160782 A1* | 8/2004 | Zimmermann ...... B60Q 1/2665 362/488 |
| 2006/0023468 A1* | 2/2006 | Takahashi ............ B60R 13/005 362/555 |
| 2009/0021459 A1 | 1/2009 | Satou et al. |
| 2009/0251917 A1 | 10/2009 | Wollner et al. |
| 2010/0104780 A1 | 4/2010 | Paxton et al. |
| 2010/0194080 A1 | 8/2010 | Paxton et al. |
| 2011/0002138 A1 | 1/2011 | Hayes et al. |
| 2012/0188779 A1 | 7/2012 | Schultz et al. |
| 2012/0217767 A1 | 8/2012 | Pennington |
| 2013/0279188 A1 | 10/2013 | Entenmann et al. |
| 2013/0329447 A1 | 12/2013 | Broer et al. |
| 2014/0077531 A1 | 3/2014 | Preisler et al. |
| 2015/0307033 A1 | 10/2015 | Preisler et al. |
| 2017/0357044 A1* | 12/2017 | Kuramitsu ............... B60Q 1/50 |

\* cited by examiner

VEHICLE INTERIOR TRIM ASSEMBLY CONFIGURED TO FORM A LIGHT PATTERN HAVING AN EMBLEM SHAPE AT THE FRONT OF A TRIM PART SUCH AS AN AIR BAG COVER

TECHNICAL FIELD

This invention generally relates to vehicle interior trim assemblies such as air bag cover assemblies which include illuminable emblems which form light emblem patterns in the passenger compartments of vehicles.

OVERVIEW

As described in U.S. Pat. No. 6,676,472, generally, there are two distinct types of lighting applications. In one, direction of the light rays is relatively unimportant. In the other, light rays must be directed in a particular manner subsequent to their generation. With respect to automotive lighting, after light rays are generated by a lamp, they must be focused/dispersed according to somewhat exacting standards. The requirements for light-directed lamps, such as headlights, sidemarkers, tail lights, brake lights, directional, hazards, CHMSLs (center, high-mounted, stop lights), differ. However, they all share the characteristic that their light rays need to be directed in some specific manner.

Lamp elements generate light rays and lenses and/or reflecting elements direct the light rays. Lamp elements generally fall into three categories: light-emitting diode (LED), incandescent and discharge.

Discharge lamps are generally characterized as having a sealed envelope filled with a gas, the atoms/ions of which, when properly excited, give off light rays. Lens elements may be categorized as refractive, Fresnel, or Total Internal Reflection (TIR). TIR lenses have the ability to gather light rays from large solid angles and redirect them efficiently.

Interior lighting systems for automotive and other vehicle applications are generally used for two purposes. One is to provide general area illumination and the other is feature lighting of specific objects, either for aesthetic or functional reasons. Traditionally, these interior lighting systems have utilized incandescent lamps for both area and feature lighting, often using lenses to control the shape and light intensity distribution of the emitted light rays. Although incandescent lamp systems can often be integrated into various vehicle interior trim components in a simple manner, various considerations do arise which complicate their use for automotive lighting. For example, where heat from the lamp could damage adjacent components or otherwise cause problems, thermal management of that heat must be implemented. Also, there is often little room in or behind a particular vehicle interior body panel or trim component for the lamp, socket, and lensing.

More recently, distributed light systems have found use in vehicles. These may use fiber optics or other means to deliver the light rays to a desired location. The use of a lens and focusing or dispersing devices may be employed to direct the light rays. It is well known that light transparent members including for example rods, panels, films, sheets and plates, can be made into light emitting members or illuminators by grooving or notching the members in a certain pattern.

Fiber optic substrates can be made into illuminators by marring or abrading the surface of the optical fibers at various points along their length to cause a portion of the light entering one or both ends of the optical fibers to be emitted from the married surface areas.

Increased surface marring results in increased light emission. Accordingly, the intensity of the light emitted along the length of the substrates can be varied by varying the density or aggressiveness of the surface marring.

Such areas as foot wells, door handles, seats, trunks, cargo areas, dashboards, door sills, headliners, grab handles, etc. may be illuminated using a wide combination of technologies. In addition to incandescent lights and fluorescent lighting, LED illumination, cold cathode technology, and electroluminescent technology may now find use.

As described in U.S. Pat. No. 8,816,586, traditionally, logos and emblems have been employed to distinguish and identify the source of various goods or property. In addition to identifying source, manufacturers rely on the use of logos and emblems, in conjunction with the benefit of trademark protection, to establish and protect their reputation. A discerning consumer may recognize a manufacturer by its logo or emblem and immediately be reminded of the manufacturer's reputation.

It is well known that a good reputation is linked with status in a community. For instance, a specific logo or emblem may be associated with a reputation for luxury and quality in the manufacturer of vehicles. As such, the vehicle consumer and or manufacturer may take pride in emphasizing the display of their vehicle's emblems as well as the corresponding good reputation associated therewith. Moreover, an individual may take pride in a specific cultural heritage, country, sports team, cause, or the like. In these cases, the individual may want to emphasize this pride by displaying the representative emblem or logo on or in the passenger compartment of a passenger vehicle.

Historically, the emphasis of a logo or emblem was achieved by increasing the number of logos/emblems on a vehicle or by adjusting the physical size of the logo/emblem itself. However, simply increasing the size and/or quantity of logos/emblems on a vehicle may achieve the desired effect of emphasis, but diminish the effect of status and/or pride proportionally.

Although some solutions may exist in the prior art that are directed to emphasizing the display of a logo or emblem with illumination, they typically involve directing an external light onto a vehicle emblem. Moreover, the directed light is typically a single color, or bulb, and cannot change color to indicate conditions or states associated with the vehicle. Additionally, the light is usually configured to illuminate the entire emblem in a non-uniform manner (i.e., areas of the emblem that are located further from the light source appear darker than the areas of the emblem that are located closer to the light source). Among other things, the prior art solutions fail to provide a dynamic emphasis of a logo or emblem while maintaining a sense of quality, luxury, or status.

Vehicles are commonly provided with various types of decorative trim parts. Vehicles also typically have various logos or designs located on interior trim pieces. However, decorative trim and designs in the vehicle cabin are difficult to perceive in darker conditions. Attempts have been made to illuminate trim logos. This is typically done by either placing the logo within the field of view of a light source or by making the logo element luminescent. The first method is not feasible for logos in most common locations, while the latter method may adversely affect the occupants' vision contrary to government regulations.

Under 49 C.F.R. Part 571.101 (FMVSS 101) 5.53 Illumination, S5.3.4 Brightness of interior lamps.

(a) Any source of illumination within the passenger compartment which is forward of a transverse vertical plane 110 mm rearward of the manikin "H" point with the driver's seat in its rearmost driving position, which is not used for the controls and displays regulated by this standard, which is not a telltale, and which is capable of being illuminated while the vehicle is in motion, shall have either:

(1) Light intensity which is manually or automatically adjustable to provide at least two levels of brightness;
(2) A single intensity that is barely discernible to a driver who has adapted to dark ambient roadway conditions; or
(3) A means of being turned off.

One practice in the automotive industry is utilization of all-plastic, fabricated parts, such as, but not limited to, instrument panels, interior trims, and door panels. It is known in other automotive parts areas that different, aesthetically pleasing outer class A surfaces enhance the overall appearance of the interior of automotive vehicles.

The following patent documents are related to the present invention: UK Patent Application GB 2492100A; U.S. Pat. Nos. 5,005,108; 5,549,323; 5,542,694; 5,558,364; 5,895,115; 6,062,595; 6,053,526; 6,158,867; 6,193,399; 6,464,381; 6,594,417; 6,652,128; 6,676,472; 6,974,238; 7,150,550; 7,201,588; 7,237,933; 7,299,892; 7,387,397; 7,441,801; 7,866,858; 7,987,030; 8,016,465; 8,061,861; 8,075,173; 8,162,519; 8,210,564; 8,215,810; 8,235,567; 8,256,945; 8,408,627; 8,408,766; 8,425,062; 8,449,161; 8,469,562; 8,596,803; 8,627,586; 8,816,586; 8,925,959; 8,067,556; 9,446,734, 9,376,055; and 9,481,296; and U.S. Published Applications 2003/0209889; 2009/0021459; 2009/0251917; 2010/0104780; 2010/0194080; 2011/0002138; 2012/0188779; 2012/0217767; 2013/0279188; 2013/0329447; 2014/0077531; and 2015/0307033.

U.S. published application 2013/0329447 discloses a lighting assembly comprising an optical fiber light guide panel member having a light conducting core cladded on opposite sides by cladding made of optically transparent material having a lower index of refraction than the light conducting core to cause total internal reflection of conducted light within the light conducting core at the core-cladding interface. Disruptions at one or more areas of the cladding cause conducted light within the light conducting core to be emitted from one or more areas of the panel member. Electrical circuitry is bonded to one or both sides of the cladding. One or more LEDs embedded in the panel member are electrically coupled to the electrical circuitry and optically coupled to the light conducting core.

Poly(methyl methacrylate) (PMMA), also known as acrylic or acrylic glass as well as by the trade names Plexiglas, Acrylite, Lucite, and Perspex among several others, is a transparent thermoplastic often used in sheet form as a lightweight or shatter-resistant alternative to glass. The same material can be utilized as a casting resin, in inks and coatings, and has many other uses.

Polycarbonates (PC) are a group of thermoplastic polymers containing carbonate groups in their chemical structures. Polycarbonates used in engineering are strong, tough materials, and some grades are optically transparent. They are easily worked, molded, and thermoformed.

Polymers such as PMMA and PC can be made into a diffusing polymer in a number of ways such as by adding light diffusing material such as self-reflecting particles to the polymers.

Despite the teachings of the above patent documents, there is still a need for an easily and inexpensively manufactured vehicle interior trim assembly configured to form a light pattern in an emblem shape of substantially uniform intensity at the front of a part such as an air bag cover.

SUMMARY OF EXAMPLE EMBODIMENTS

An object of at least one embodiment of the present invention is to provide an improved vehicle interior trim assembly having an illuminable emblem configured to form a light pattern in the passenger compartment of the vehicle wherein the assembly is light weight and compact and can be easily and inexpensively manufactured.

In carrying out the above object and other objects of at least one embodiment of the present invention, a vehicle interior trim assembly having an illuminable emblem is provided. The assembly includes a vehicle interior trim part having front and back surfaces. The front surface faces a passenger compartment of the vehicle. An illumination module including a light source is configured to generate visible light rays when energized. A lens includes at least one layer molded in a molding process from an optical-grade material. The lens has a pattern of light-extracting deformities to extract light rays from an interior of the lens at a set of surface-defining areas of the lens. The areas are sized, shaped and arranged laterally relative to each other in an emblem pattern at the front surface of the part. A decorative emblem has reflective surfaces overlying and spaced away from the surface-defining areas by an air gap. The lens receives the light rays from the illumination module into the interior of the lens at an entry face of the lens. The deformities extract the light rays from the interior of the lens through the surface-defining areas. The extracted light rays travel across the gap and are reflected by the reflective surfaces of the decorative emblem to generate light in the emblem pattern about peripheral surfaces of the decorative emblem.

The decorative emblem may be a spoked wheel having inner and outer peripheral surfaces.

The lens may be a total internal reflection (TIR) type lens.

The lens may include a cone TIR optic portion to redirect the light rays to the peripheral surfaces.

The decorative emblem may include a metallized layer having the reflective surfaces.

The assembly may further comprise an opaque layer having a class A surface overlying the at least one layer to block light rays from entering the passenger compartment from the at least one layer.

The opaque layer may be an opaque paint layer.

The lens may include a first layer molded from a transparent, optical-grade material in the molding process and the opaque layer may be bonded to the first layer and formed from an opaque material onto the first layer in the molding process.

The molding process may be an injection molding process such as a multi-shot molding process.

The light source may include a light emitting diode (LED).

The illumination module may include an electrically conductive circuit wherein the LED is electrically coupled to the circuit.

The trim part may be an air bag cover.

The reflective surfaces may be curved.

Further in carrying out the above object and other objects of at least one embodiment of the present invention, a vehicle air bag cover assembly having an illuminable emblem is provided. The assembly includes a vehicle interior air bag cover having front and back surfaces. The front surface faces a passenger compartment of the vehicle. An illumination module including a light source is configured to generate visible light rays when energized. A lens includes at least one layer molded in a molding process from an optical-grade material. The lens has a pattern of light-extracting deformities to extract light rays from an interior of the lens at a set of surface-defining areas of the lens. The areas are sized, shaped and arranged laterally relative to each other in an emblem pattern at the front surface of the part. A decorative emblem has reflective surfaces overlying and spaced from the surface-defining areas by an air gap. The lens receives the light rays from the illumination module into the interior of the lens at an entry face of the lens. The deformities extract the light rays from the interior of the lens through the surface-defining areas. The extracted light rays travel across the gap and are reflected by the reflective surfaces of the decorative emblem.

The decorative emblem may be a spoked wheel having inner and outer peripheral surfaces.

The lens may be a total internal reflection (TIR) type lens.

The lens may include a cone TIR optic portion to redirect the light rays to the peripheral surfaces.

The declarative emblem may include a metallized layer having the reflective surfaces.

The assembly may further comprise an opaque layer having a Class A surface overlying the at least one layer to block light rays from entering the passenger compartment from the at least one layer.

The opaque layer may comprise an opaque paint layer.

The lens may include a first layer molded from a transparent, optical-grade material in the molding process and the opaque layer may be bonded to the first layer and formed from an opaque material onto the first layer in the molding process.

The molding process may be an injection molding process such as a multi-shot molding process.

The light source may include a light emitting diode (LED).

The illumination module may include an electrically conductive circuit wherein the LED is electrically coupled to the circuit.

Other technical advantages will be readily apparent to one skilled in the art from the following figures, descriptions and claims. Moreover, while specific advantages have been enumerated, various embodiments may include all, some or none of the enumerated advantages.

DETAILED DESCRIPTION

Figure 1:
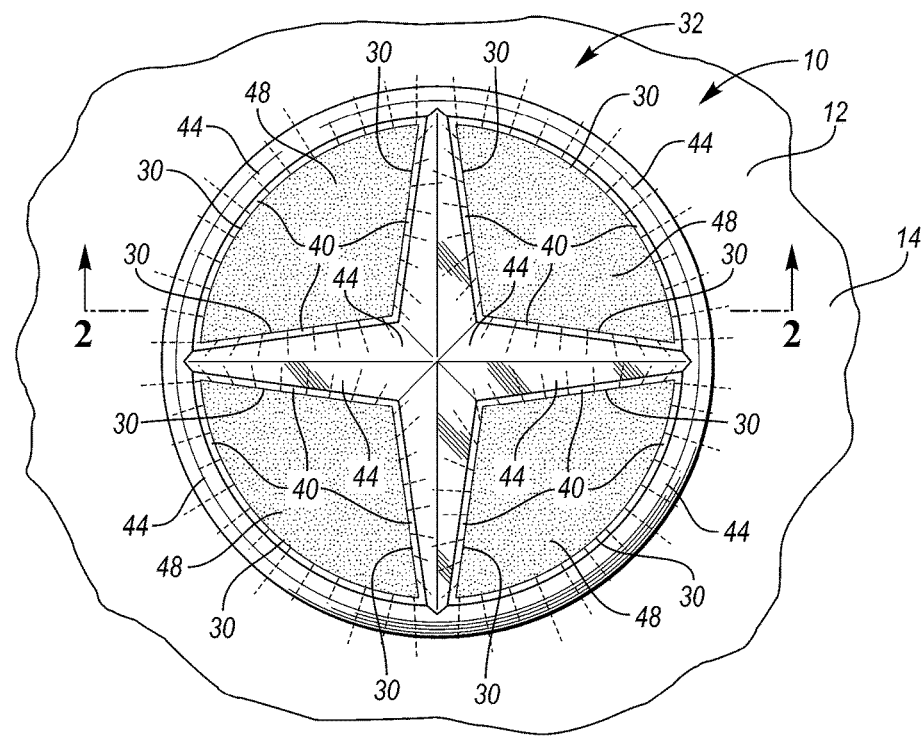
FIG. 1 is a top plan view, partially broken away, of a vehicle interior trim assembly having an illuminable emblem constructed in accordance with at least one embodiment of the present invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As used in this application, the term "substrate" refers to any flexible, semi-flexible or rigid single or multi-layer component having a surface to which a decorative layer or coating is or can be applied by the methods described herein such as, without limitation, polymers and other plastics, as well as composite materials. Furthermore, the shape of the substrate and particularly the surface to be coated or layered can be any part of an assembly or device manufactured by any of various methods, such as, without limitation, conventional molding, extruding, or otherwise fabricated. One preferred application contemplated herein is the coating of substrates that are automotive components such as automotive interior trim components.

The term "overlies" and cognate terms such as "overlying" and the like, when referring to the relationship of one or a first, superjacent layer relative to another or a second, subjacent layer, means that the first layer partially or completely lies over the second layer. The first, superjacent layer overlying the second, subjacent layer may or may not be in contact with the subjacent layer; one or more additional layers may be positioned between respective first and second, or superjacent and subjacent, layers.

Referring now to the drawing figures, a vehicle interior trim assembly having an illuminable emblem is generally indicated at 10. The assembly 10 includes a vehicle interior trim part 12 such as an air bag cover having a front surface 14 and a back surface (not shown). The front surface 14 faces a passenger compartment 18 of the vehicle.

An illumination module, generally indicated at 20, includes a light source such as an LED 22 configured to generate visible light rays when energized.

A lens, generally indicated at 24, includes at least one layer such as a TIR optical lens molded in a molding process from a transparent, optical-grade material such as PMMA or PC. The lens 24 has a pattern of light-extracting deformities one of which is shown at 26 in FIGS. 3 and 4 to extract light rays from an interior of the lens 24 at a set of surface-defining areas 28 of the lens 24 which are sized, shaped and arranged laterally relative to each other in an emblem pattern 30 at the front surface 14 of the part 12 as shown in FIG. 1.

A decorative emblem, generally indicated at 32, has lower reflective surfaces 34 overlying and spaced away from the surface-defining areas 28 by air gaps 36. The lens 24 receives the light rays from the illumination module 20 into the interior of the lens 24 and emits the light rays through the surface-defining areas 28. The extracted light rays travel across the gap 36 and are reflected by the reflective surfaces 34 of the decorative emblem 32 to generate light in the emblem pattern 30 about peripheral surfaces 40 of the decorative emblem 32 as seen in FIG. 1. Preferably, the decorative emblem 32 has a spoked-wheel configuration having inner and outer peripheral surfaces 40 as shown in FIG. 1.

Preferably, the lens 24 is a total internal reflection (TIR) type lens including a cone TIR optic portion 42 to redirect the light rays to the peripheral surfaces 40.

The decorative emblem 32 includes a metallized (i.e. chrome) layer 44 having the reflective surfaces 34 which are preferably curved. The layer 44 may be plated on a plastic substrate, generally indicated at 33, as described hereinbelow.

The assembly 10 may further include an opaque layer 46 having a class A surface 48 overlying the lens 24 to block light rays from entering the passenger compartment 18 from the lens 24. The opaque layer 46 may comprise an opaque (i.e. black) paint layer.

In another embodiment, the lens 24 is molded from a transparent, optical-grade material in the molding process and the opaque layer 46 is bonded to the lens 24 and formed from an opaque material such as an opaque (i.e. black) plastic onto the lens 24 in the molding process. The molding process is preferably an injection molding process such as a multi-shot molding process.

Preferably, the illumination module 20 preferably includes an electrically conductive circuit (not shown) wherein the LED 22 is electrically coupled to the circuit. The module 20 includes a printed circuit board 50 on which the LED 22 and the circuit are mounted. The circuit board 50 is preferably supported by the lens 24 via heat stakes (not shown) or pins which extend from the back surface of the lens 24 so that light rays from the LED 22 enter a TIR optic portion 52.

In summary, the logo is back lit from the LED 22 and uses a TIR (Total Internal Reflection) type lens 24. The light changes direction via the cone TIR optic portion 42 to send it out laterally to the ends of the emblem 32. Light is extracted at any point along the surface by forming a pattern of light-extracting deformities such as texture 26 on the back surface of the lens 24 as is well known in the art noted in the Overview section of this application.

Figure 2:
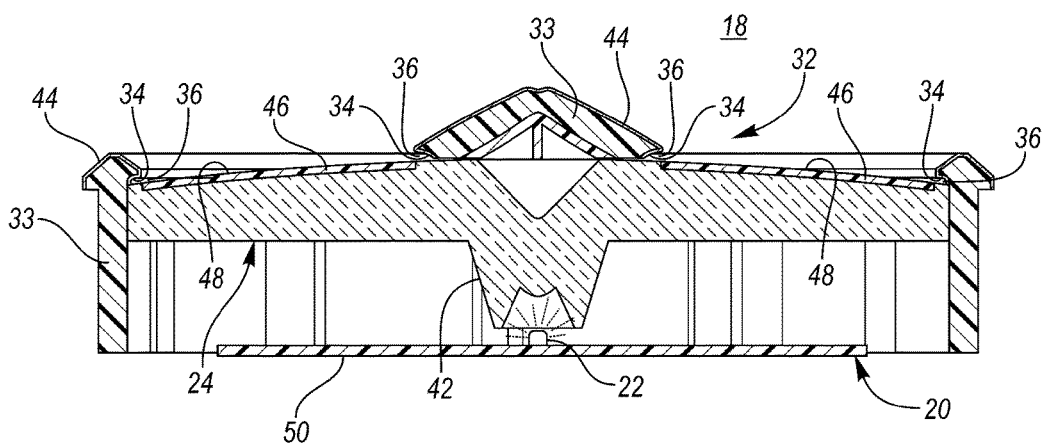
FIG. 2 is a side view, partially broken away and in cross section, of the assembly taken along lines 1-1 of FIG. 1.
Figure 3:
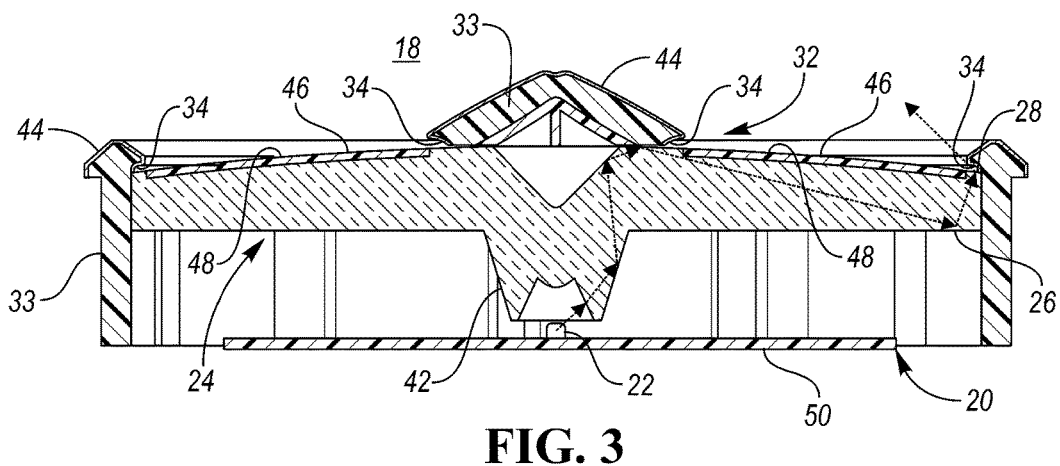
FIG. 3 is a view similar to the view of FIG. 2 but also showing the path of a light ray from a light source such as an LED into the passenger compartment of the vehicle.
Figure 4:
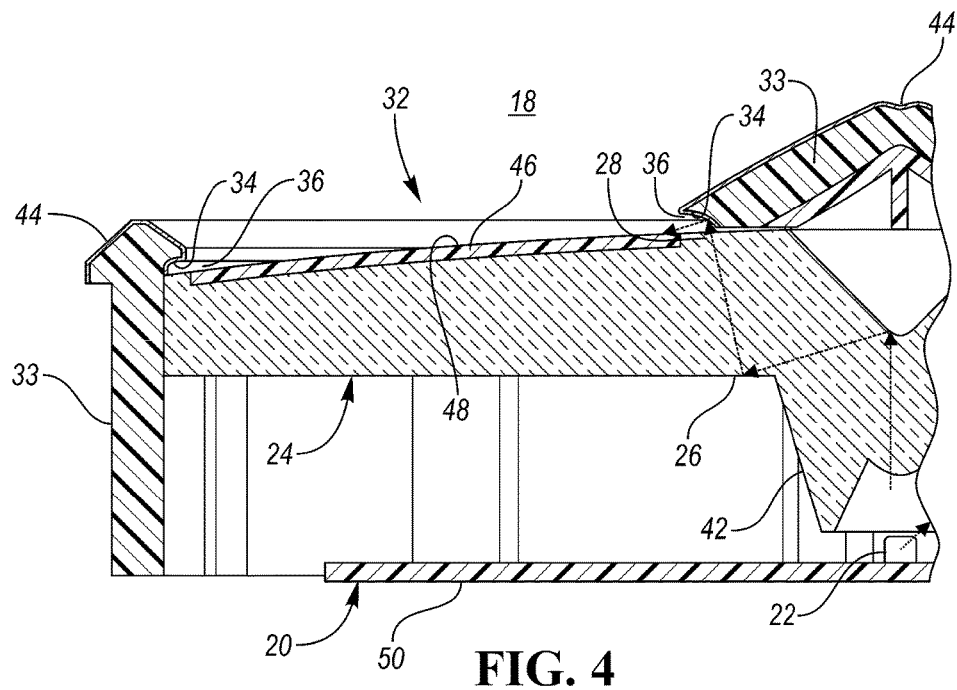
FIG. 4 is an enlarged view, partially broken away and in cross section, of the assembly of FIG. 1 but also showing the path of another light ray tracking through a lens of the assembly and into the passenger compartment.

Emitted light also hits the bottom surfaces of the chrome emblem 32 and reflects off of the curved reflective surface 34 to reflect light across the top surface of the lens 24. FIGS. 2-4 show the multiple layers of the emblem 32, including the polymeric substrate 33, and the decorative, metal layer 44 overlying the substrate 33.

The part 12 is suitable for use with an automobile, which can be any passenger vehicle used for land transportation, such as a car, minivan, truck, etc. According to alternative embodiments, the part may be used with any type of vehicle, such as water vehicles, air vehicles, etc.

The module 20 may be electrically connected to a controller (not shown) which, in turn, is electrically connected or coupled to an electrical system of the vehicle. The part 12 is backlit and may be selectively turned "on" and "off" by the controller which controllably supplies electrical power from the system to the module 20. The controller is typically electrically connected to one or more switches and/or one or more sensors so that the module 20 can be manually or automatically operated to turn the module 20 "on" or "off". For example, the controller can be electrically connected to an ignition switch, a light sensor, a headlight switch and/or an interior light switch as needed and/or desired.

The printed circuit board (PCB) 50 may include a control circuit coupled to the controller. The control circuit may comprise one or more analog and/or digital electrical or electronic components, and may include a microprocessor, microcontroller, application-specific integrated circuit (ASIC), programmable logic, and/or other circuit elements. According to an exemplary embodiment, the control circuit is configured to receive data via one or more electrical wires or buses from a plurality of automobile systems within the automobile. For example, the control circuit can be configured to receive data from sensors on an automobile. According to various exemplary embodiments, the circuit board may be a printed circuit board 50, a flexible circuit board, a rigid circuit board, conductive foil, and/or other suitable form.

The decorative layer 44 may be made of any reflective, opaque material, such as, for example, decorative films, hot stamp foil, chrome, metallic coating (e.g., by vacuum metallization or other methods), or a secondary part.

A protective layer (not shown) may overlie and protect the decorative layer 44. The protective layer may be a transparent or translucent plastic such as polycarbonate, acrylic, ABS, plexi-glass, lexant; polypropylene, poly(methyl methacrylate), thermoplastic urethane, polyester, copolyester alloy, cyclic olefin copolymer, poly-4-methyl-1-pentene, polysulphone, allyl diglycol carbonate, allyl ester, styreneacrylonitrile, polystyrene, polyvinyl chloride and blends, alloys and combinations thereof. The protective layer may include one or more pigments, tints, colored dyes, metallic flakes or light reflective particles therein. The protective layer may include one or more anti-fading components, one or more anti-soiling components and one or more water-repellant compounds.

The light source 22 may include an incandescent bulb, a fluorescent bulb, a light emitting diode (LED), a light pipe, an electroluminescent device, a neon or argon bulb or fiber optics. The light source(s) may produce light of any color or from any portion of the light spectrum. In various exemplary embodiments, a light filter (not shown) may be placed between the light source 22 and the lens 24.

In summary, the part 12 is provided with a feature for lighting to show a logo or image at the front of the part 12. The lighted logo or image can be seen on an A-surface of the part 12. The image or logo can be viewed during the day and illuminated at night.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle interior trim assembly having an illuminable emblem, the assembly comprising:
    a vehicle interior trim part having front and back surfaces, the front surface facing a passenger compartment of the vehicle;
    an illumination module including a light source configured to generate visible light rays when energized;
    a lens including at least one layer molded in a molding process from an optical-grade material, the lens having a pattern of light-extracting deformities to extract light rays from an interior of the lens at a set of surface-defining areas of the lens which are sized, shaped and arranged laterally relative to each other in an emblem pattern at the front surface of the part; and
    a decorative emblem having reflective surfaces overlying and spaced away from the surface-defining areas by an air gap, the lens receiving the light rays from the illumination module into the interior of the lens at an entry face of the lens, the deformities extracting the light rays from the interior of the lens through the surface-defining areas, the extracted light rays traveling across the gap are reflected by the reflective surfaces of the decorative emblem to generate light in the emblem pattern about peripheral surfaces of the decorative emblem.

2. The assembly as claimed in claim 1, wherein the decorative emblem is a spoked wheel having inner and outer peripheral surfaces.

3. The assembly as claimed in claim 1, wherein the lens includes a total internal reflection (TIR) type lens.

4. The assembly as claimed in claim 2, wherein the lens includes a cone TIR optic portion to redirect the light rays to the peripheral surfaces.

5. The assembly as claimed in claim 1, wherein the decorative emblem includes a metallized layer having the reflective surfaces.

6. The assembly as claimed in claim 1, further comprising an opaque layer having a class A surface overlying the at least one layer to block light rays from entering the passenger compartment from the at least one layer.

7. The assembly as claimed in claim 6, wherein the opaque layer comprises an opaque paint layer.

8. The assembly as claimed in claim 6, wherein the lens includes a first layer molded from a transparent, optical-grade material in the molding process and the opaque layer is bonded to the first layer and formed from an opaque material onto the first layer in the molding process.

9. The assembly as claimed in claim 8, wherein the molding process is an injection molding process.

10. The assembly as claimed in claim 9, wherein the injection molding process comprises a multi-shot molding process.

11. The assembly as claimed in claim 1, wherein the light source includes a light emitting diode (LED).

12. The assembly as claimed in claim 11, wherein the illumination module includes an electrically conductive circuit and wherein the LED is electrically coupled to the circuit.

13. The assembly as claimed in claim 1, wherein the trim part is an air bag cover.

14. The assembly as claimed in claim 1, wherein the reflective surfaces are curved.

15. A vehicle air bag cover assembly having an illuminable emblem, the assembly comprising:
a vehicle interior air bag cover having front and back surfaces, the front surface facing a passenger compartment of the vehicle;
an illumination module including a light source configured to generate visible light rays when energized;
a lens including at least one layer molded in a molding process from an optical-grade material, the lens having a pattern of light-extracting deformities to extract light rays from an interior of the lens at a set of surface-defining areas of the lens which are sized, shaped and arranged laterally relative to each other in an emblem pattern at the front surface of the part; and
a decorative emblem having reflective surfaces overlying and spaced from the surface-defining areas by an air gap, the lens receiving the light rays from the illumination module into the interior of the lens at an entry face of the lens, the deformities extracting the light rays from the interior of the lens through the surface-defining areas, the extracted light rays traveling across the gap are reflected by the reflective surfaces of the decorative emblem to generate light in the emblem pattern about peripheral surfaces of the decorative emblem.

16. The assembly as claimed in claim 15, wherein the decorative emblem is a spoked wheel having inner and outer peripheral surfaces.

17. The assembly as claimed in claim 15, wherein the lens includes a total internal reflection (TIR) type lens.

18. The assembly as claimed in claim 16, wherein the lens includes a cone TIR optic portion to redirect the light rays to the peripheral surfaces.

19. The assembly as claimed in claim 15, wherein the declarative emblem includes a metallized layer having the reflective surfaces.

20. The assembly as claimed in claim 15, further comprising an opaque layer having a class A surface overlying the at least one layer to block light rays from entering the passenger compartment from the at least one layer.

21. The assembly as claimed in claim 20, wherein the opaque layer comprises an opaque paint layer.

22. The assembly as claimed in claim 20, wherein the lens includes a first layer molded from a transparent, optical-grade material in the molding process and the opaque layer is bonded to the first layer and formed from an opaque material onto the first layer in the molding process.

23. The assembly as claimed in claim 22, wherein the molding process is an injection molding process.

24. The assembly as claimed in claim 23, wherein the injection molding process comprises a multi-shot molding process.

25. The assembly as claimed in claim 15, wherein the light source includes a light emitting diode (LED).

26. The assembly as claimed in claim 25, wherein the illumination module includes an electrically conductive circuit and wherein the LED is electrically coupled to the circuit.

\* \* \* \* \*